US006847821B1

United States Patent
Lewis et al.

(10) Patent No.: US 6,847,821 B1
(45) Date of Patent: Jan. 25, 2005

(54) METHOD AND SYSTEM IN A WIRELESS COMMUNICATIONS NETWORK FOR THE SIMULTANEOUS TRANSMISSION OF BOTH VOICE AND NON-VOICE DATA OVER A SINGLE RADIO FREQUENCY CHANNEL

(75) Inventors: Larry DeWayne Lewis, Garland, TX (US); Jerry Louis Mezell, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 935 days.

(21) Appl. No.: 09/152,759

(22) Filed: Sep. 14, 1998

(51) Int. Cl.$^7$ .............................. H04Q 7/20; H04J 3/22
(52) U.S. Cl. .................. 455/452.2; 455/436; 370/337; 370/347; 370/442; 370/458; 370/468; 370/498
(58) Field of Search ............................... 455/450, 451, 455/452, 509, 511, 452.1, 452.2, 436; 370/337, 329, 341, 347, 435, 442, 458, 468, 498

(56) References Cited

U.S. PATENT DOCUMENTS

| | | | | |
|---|---|---|---|---|
| 5,511,072 A | * | 4/1996 | Delprat ........................ | 370/336 |
| 5,521,925 A | * | 5/1996 | Merakos et al. ............ | 370/337 |
| 5,896,375 A | * | 4/1999 | Dent et al. ................... | 370/347 |
| 6,016,428 A | * | 1/2000 | Diachina et al. .......... | 455/435.1 |
| 6,028,854 A | * | 2/2000 | Raith et al. ................. | 370/347 |

* cited by examiner

*Primary Examiner*—Lester G. Kincaid
*Assistant Examiner*—Rafael Perez-Gutierrez

(74) *Attorney, Agent, or Firm*—John D. Crane; Dillon & Yudell LLP

(57) ABSTRACT

A method and system in a wireless communications network for the simultaneous transmission of voice and non-voice data over a single dedicated radio frequency channel to a mobile unit having a primary transmission bandwidth. Initially, voice data are transmitted to a mobile unit via a primary time interval within a single dedicated radio frequency channel. An unoccupied secondary time interval available to the mobile unit is then identified. Thereafter, non-voice data are transmitted to the mobile unit via the secondary time interval, in response to identifying the secondary time interval. The primary transmission bandwidth of the mobile unit is next automatically broadened to encompass both the primary time interval and the secondary time interval. Finally, the primary time interval and the secondary time interval are linked within the single dedicated radio frequency channel to permit the subsequent processing of the voice and non-voice data as a single transmitted unit over the single dedicated radio frequency channel. In identifying an unoccupied secondary time interval available to the mobile unit, time intervals positioned adjacent the primary time interval are examined to determine occupancy. If an adjacent time interval is determined to be occupied, the call being processed within that adjacent time interval is handed off to another channel or mobile unit, leaving that adjacent time interval open and unoccupied. The non-voice data is then transmitted to the mobile unit via the adjacent time interval, such that the adjacent time interval comprises an identified secondary time interval available to the mobile unit. The wireless communications network may be composed of a cellular telephone network operating alone or in association with landline-based components.

18 Claims, 4 Drawing Sheets

METHOD AND SYSTEM IN A WIRELESS COMMUNICATIONS NETWORK FOR THE SIMULTANEOUS TRANSMISSION OF BOTH VOICE AND NON-VOICE DATA OVER A SINGLE RADIO FREQUENCY CHANNEL

BACKGROUND OF THE INVENTION

1. Technical Field

The present invention relates in general to an improved communications system. In particular, the present invention relates to an improved wireless communications system. More particularly, the present invention relates to an improved wireless communications system in which both voice and non-voice data may be transmitted to mobile units over a single dedicated radio frequency channel. Still more particularly, the present invention relates to the manipulation of time intervals or time slots within a single radio frequency channel.

2. Description of the Related Art

Communication networks, such as wireless and wireline telephone systems, are well-known. A typical wireline based communications system utilizes a physical path to transmit signals. Such wireline systems are also referred to as "landline" systems. Examples of wireline communications systems include telephone, telegraph, facsimile, closed circuit television and so forth. Examples of wireless communication systems include cellular telephone systems. A cellular telephone system, in particular, includes cellular subscriber units that can be mobile or portable, and cellular base stations which are connected to the public telephone company via one or more cellular switching networks. Each cellular subscriber has an assigned cellular telephone number which allows the user (i.e., the cellular subscriber) to place and receive calls within a widespread range of the cellular base stations, such as throughout a metropolitan area.

Computerized switching is essential to the operation of both wireline and wireless telephone communication systems. Telephone communication networks typically provide features for redirecting calls on behalf of telephone users. Examples of such features include call forwarding, call transfer, release link trunking; and simultaneous ringing, all well known in the communications arts. Call forwarding, for example, is a network-provided service feature in which calls may be redirected from an originally called address to another address specified by a call forwarding party.

In wireless networks, in particular, it is often desirable to send voice data along with non-voice data, to a mobile unit, such as a mobile cellular telephone. Presently, sending non-voice data to a mobile unit, along with voice data, is a difficult task, due to interference, corruption of the given channel on which the data flows, and limited time slots or time intervals available on such channels. Time division multiplexing (TDMA) is often utilized to send data to mobile units operating within a particular wireless network. TDMA involves the derivation of two or more channels from a single channel by assigning discrete time intervals in sequence to each of the desired channels. In essence, the bandwidth of a particular signal is narrowed or "chopped" up into smaller bandwidths to create multiple channels. Thus, non-voice data associated with voice data can be sent to a mobile unit, but only via separate channels, which is an inefficient waste of signal space.

From the foregoing it can be appreciated then is some sort of method and system which would allow both voice data and non-voice data to ride the same signal, thus freeing other channels for other tasks. What would be desirable would be a method and system which would take advantage of TDMA technology to accomplish this task. However, to date such method and systems do not exist. The present invention disclosed herein solves these problems by implementing a method and system which allows both voice and non-voice data to broadcast over a single dedicated channel.

SUMMARY OF THE INVENTION

It is therefore one object of the present invention to provide an improved communications system.

It is therefore another object of the present invention to provide an improved wireless communications system.

It is yet another object of the present invention to provide an improved wireless communications system in which both voice and non-voice data may be transmitted to mobile units over a single dedicated radio frequency channel.

The above and other objects are achieved as is now described. A method and system in a wireless communications network for the simultaneous transmission of voice and non-voice data over a single dedicated radio frequency channel to a mobile unit having a primary transmission bandwidth. Initially, voice data are transmitted to a mobile unit via a primary time interval within a single dedicated radio frequency channel. An unoccupied secondary time interval available to the mobile unit is then identified. Thereafter, non-voice data are transmitted to the mobile unit via the secondary time interval, in response to identifying the secondary time interval. The primary transmission bandwidth of the mobile unit is next automatically broadened to encompass both the primary time interval and the secondary time interval. Finally, the primary time interval and the secondary time interval are linked within the single dedicated radio frequency channel to permit the subsequent processing of the voice and non-voice data as a single transmitted unit over the single dedicated radio frequency channel. In identifying an unoccupied secondary time interval available to the mobile unit, time intervals positioned adjacent the primary time interval are examined to determine occupancy. If an adjacent time interval is determined to be occupied, the call being processed within that adjacent time interval is handed off to another channel or mobile unit, leaving that adjacent time interval open and unoccupied. The non-voice data is then transmitted to the mobile unit via the adjacent time interval, such that the adjacent time interval comprises an identified secondary time interval available to the mobile unit. The wireless communications network may be composed of a cellular telephone network operating alone or in association with landline-based components.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
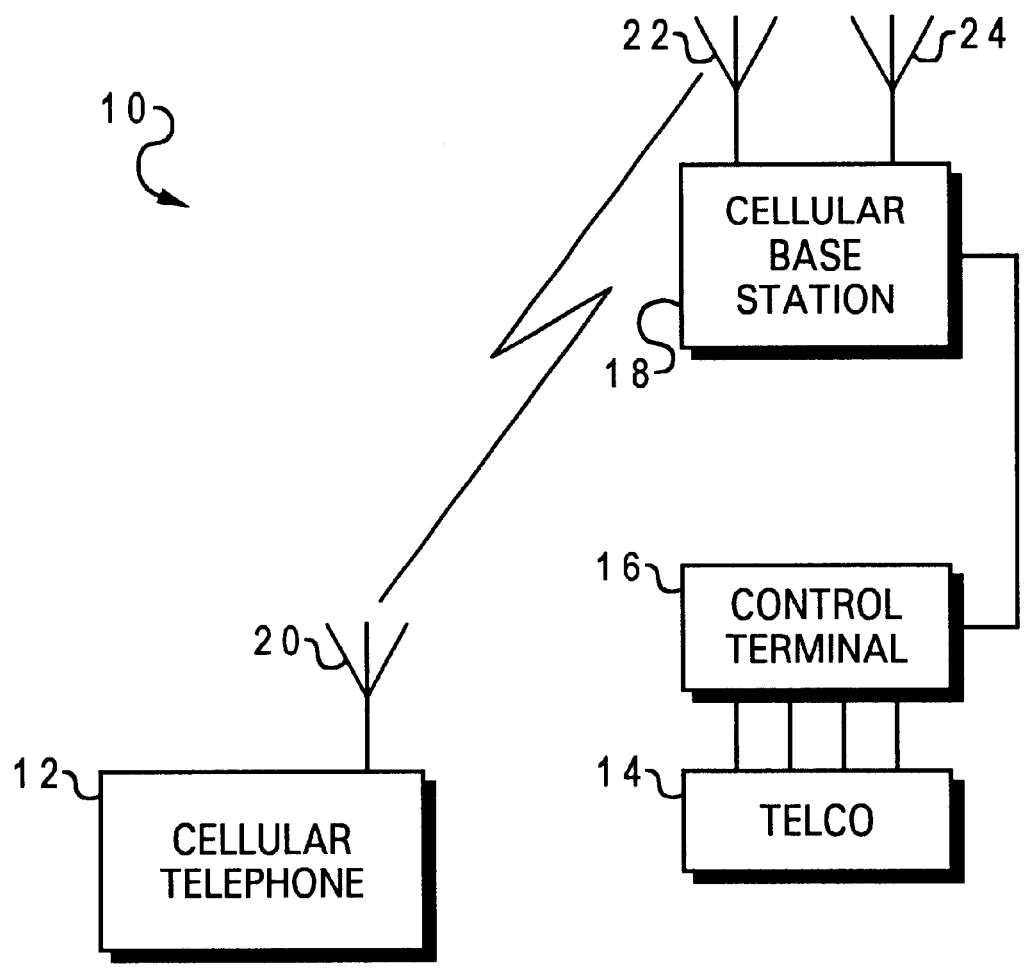
FIG. 1 illustrates a block diagram illustrative of a cellular telephone system in which a preferred embodiment of the present invention may be implemented.

With reference now to the figures and in particular with reference to FIG. 1, there is depicted a block diagram of a cellular telephone system 10 in which a preferred embodiment of the present invention may be implemented. The cellular telephone system 10 depicted in FIG. 1 includes a telephone company phone. system (TELCO) 14, connected by telephone landlines to a control terminal 16 which in turn is coupled, also by telephone landlines, to a cellular base station 18 that is located in a cell of a mobile cellular telephone system. Those skilled in the art will appreciate that cellular telephone system 10 is one type of a communications system which may be utilized in accordance with a preferred embodiment of the present invention. For example, non-cellular, wireline and other such implemented telephone systems may be utilized in accordance with a preferred embodiment of the present invention. Cellular telephone system 10 as described herein is presented for illustrative purposes only.

Cellular telephone 12 communicates with cellular base station 18 via antennas 22 and 20. Antennas 22 and 20 can be implemented as telescopic whip antennas that extend or retract (i.e., lengthen or shorten), by being constructed in the form of overlapping concentric cylinders that slide inside of each other and make electrical contact with each other. It will be appreciated by those skilled in the art that such antennas are, of course, only examples of antennas that can be utilized with a cellular telephone system such as cellular telephone system 10. A wide variety of other antennae can also be utilized in conjunction with a wireless communication system such as cellular telephone system 10. Also, the landlines utilized in association with cellular telephone system 10 are lines that can be placed in areas on land or inland waterways, and can include twisted-pair lines, coaxial cables, and fiber optic cables utilized in overhead, direct buried, underground, microwave, and satellite applications.

Additional cellular base stations may be located throughout a geographic area to provide telephone service to cellular telephones 12. Cellular base station 18 incorporates both a receiver antenna 22 and a transmitter antenna 24 for communicating with cellular telephones 12. Cellular telephone 12 may be a mobile-unit installed in a vehicle, a transportable unit which is a mobile-unit and battery installed in a carrying case, or a hand-held portable unit. Cellular telephone 12 includes an antenna 20 for the cellular radio channels. In the United States, the cellular radio channels are in the frequency band from 824–894 MHz. More particularly, in the United States, a total bandwidth of 50 MHz is allocated for cellular mobile service, the 50 MHz distributed between 824 MHz and 849 MHz, and 869 MHz and 894 MHz of the frequency spectrum. Also, recently the FCC has auctioned off bandwidths in the 1.9 GHz range. All of these bands can be utilized in accordance with a preferred embodiment of the present invention.

Figure 2:
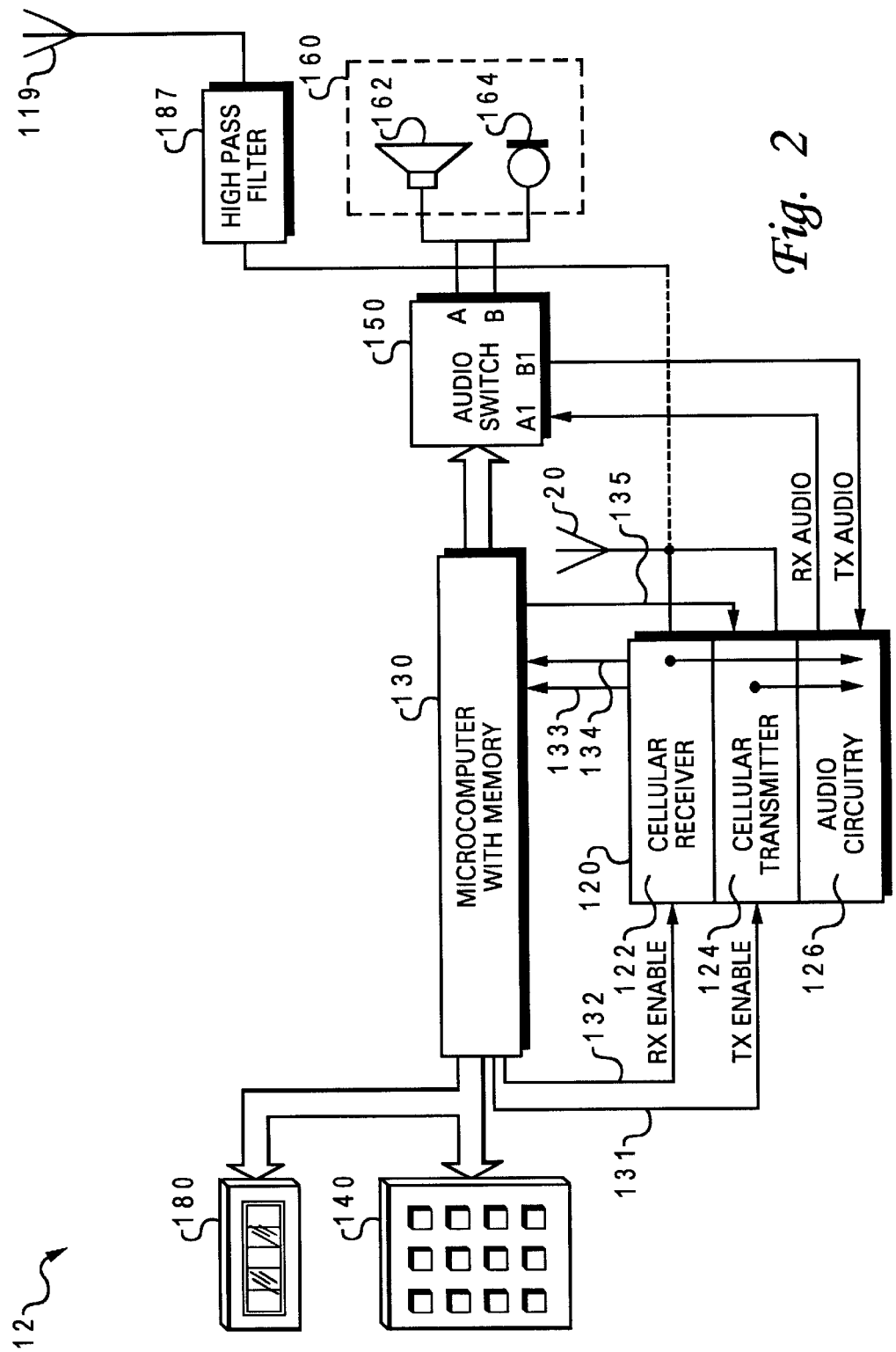
FIG. 2 depicts a block diagram illustrative of a cellular telephone which may be implemented in accordance with a preferred embodiment of the present invention.

FIG. 2 is a block diagram of a cellular telephone 12 which may be implemented in accordance with a preferred embodiment of the present invention. Those skilled in the art will appreciate that although cellular telephone 12 may be utilized in accordance with a preferred embodiment of the present invention, that other types of cellular telephone configurations may also be utilized. Cellular telephone 12 includes antenna 20, cellular telephone transceiver 120, microcomputer 130, keypad 140, display 180, audio switch 150, and handset 160, including speaker 162 and microphone 164. Microcomputer 130 is a computer built around a single chip microprocessor. Less powerful than minicomputers and mainframe computers, microcomputer 130 is nevertheless capable of complex tasks involving the processing of logical operations. Microcomputer 130 includes a central processing unit (CPU) (i.e., not shown), which is the computational and control unit of microcomputer 130, and which interprets and executes instructions for cellular telephone 12.

Alternatively, cellular telephone transceiver 120 may be coupled to a single antenna 119 in place of antenna 20 and by way of high-pass filter 187, respectively. High-pass filter 187 is utilized to filter only those signals which fall within a frequency range utilized by cellular telephones in the United States. High-pass filter 187 can be further modified to allow for cellular telephone frequency ranges of countries other than the United States. Specific design parameters of such a high-pass filter are left to the discretion of the manufacturer of a cellular telephone such as cellular telephone 12. Display 180 can be any type of display device which visually presents data to a cellular telephone user.

Display devices such as a light-emitting diode panel or liquid crystal display can be utilized to implement display 180. Keypad 140 is a set of keys that are mounted on a small keyboard and are dedicated to a specific purpose, such as inserting numbers. Keypad 140 is preferably modeled on the standard telephone keypad. Control signals 131 TX ENABLE and 132 RX ENABLE of microcomputer 130 enable cellular transmitter 124 and cellular receiver 122, respectively. In addition to control signals 131 and 132 to cellular transceiver 120, microcomputer 130 also monitors control signals 133 RSSI, 134, RX DATA, and 135 TX DATA for detecting signal strength, for detecting receive data and for sending transmit data, respectively, utilized in operation of cellular transceiver 120.

Figure 3:
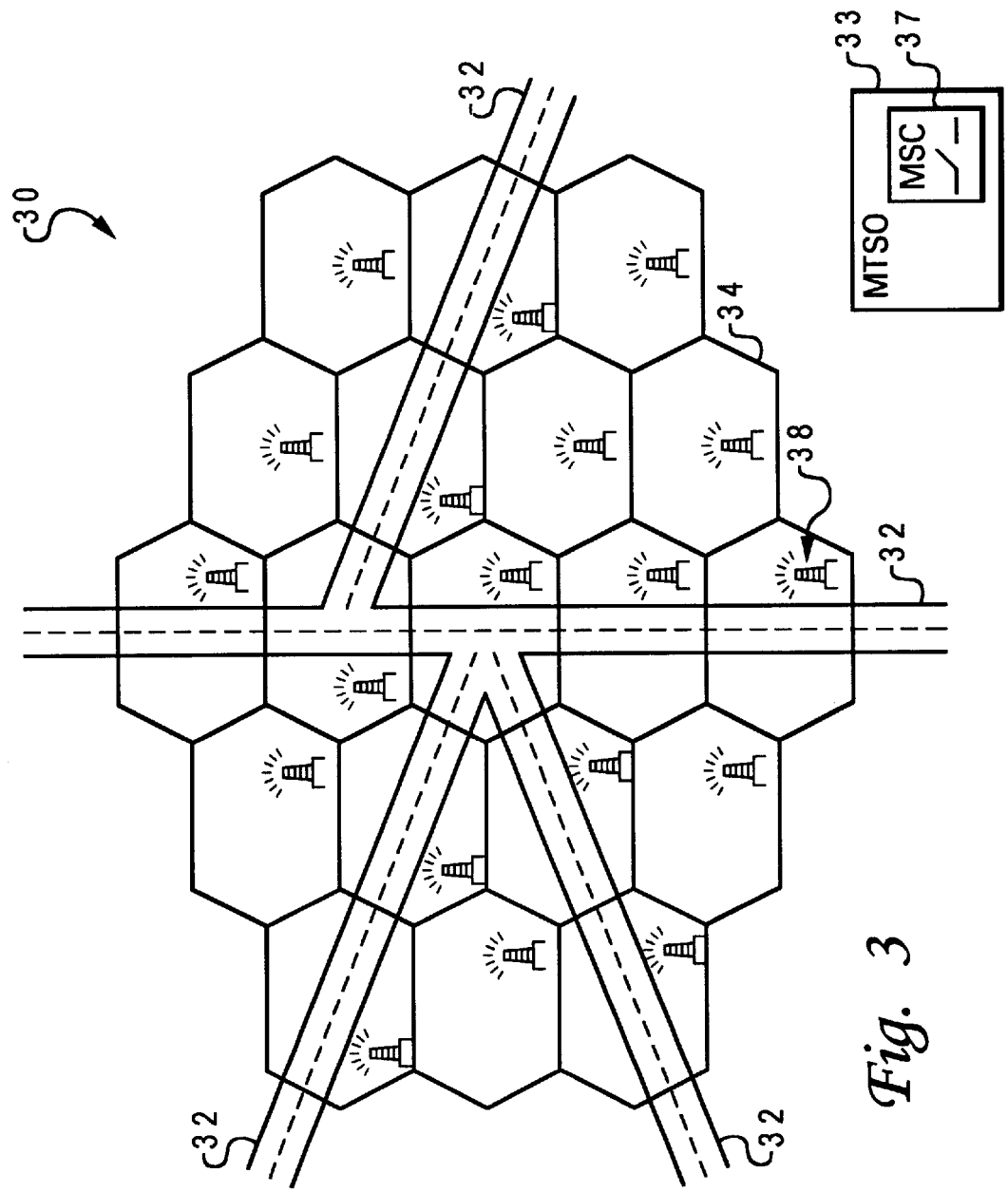
FIG. 3 depicts a pictorial representation illustrative of a cellular telephone system in which a preferred embodiment of the present invention can be implemented.

FIG. 3 depicts a pictorial representation illustrative of a cellular telephone system 30 in which a preferred embodiment of the present invention can be implemented. Cellular telephone system 30 is analogous to cellular telephone system 10 depicted in FIG. 1, and may incorporate utilization of communications devices such as cellular telephone 12 depicted in FIG. 2. Cellular telephone system 30 is composed of a variety of cells 34. Each cell encompasses a specified geographic area. Each geographic area has its own base station 38 and a single controller (not shown) interconnected with a public telephone network. Each cell 34 sits adjacent another cell to create a honeycomb pattern of cells.

Thus, the term "cellular" as utilized in cellular communications networks and systems such cellular telephone system 30 derives from the honeycomb shape of the areas into which a coverage region is divided. Cells 34 are essentially base stations such as cellular base station 18 of FIG. 1 transmitting over small geographic areas that are represented in FIG. 3 as hexagons. Each cell size varies depending on the landscape. Because of constraints imposed by natural terrain and man-made structures, the true shape of each cell 34 is not a perfect hexagon. Cells 34 can cover a large metropolitan area. Each cell 34 can have a radius of about 13 to 19 km (8 to 12 miles), depending upon the strength of each base station 38.

Specific cell radii are not necessary features of the present invention. Cells can have ranges as low as several hundred feet up to approximately 25 miles in radius. The specific numbers described herein are for demonstrative purposes only and are not necessary features of the present invention. Although not depicted in FIG. 3, each cell 34 can be further subdivided into still smaller cells. In this way, the honeycomb pattern of cells 34 can repeatedly utilize the same range of radio frequencies without interfering with one another, so long as neighboring cells 34 do not utilize precisely the same radio channels.

Although not shown in FIG. 3, each cell 34 can include six directional antennas, centrally located in each cell 34, each radiating into a sixty degree section of each cell. A plurality of cells 34 are combined to form cellular telephone system 30 covering a particular geographic area. This cellular system enables mobile cellular telephone traffic to communicate with landline telephone networks and other mobile cellular telephones while moving through the geographic area. Each cell 34 also has a number of frequencies, transmitted by low power transmitters, assigned to it that cannot be utilized in adjacent cells because of frequency interference problems. Due to the low power of each cell's transmitter, however, the same frequency can be re-utilized in other cells, referred to as co-channel cells in the same metropolitan area.

Cellular telephone system 30 is an example of a cellular mobile service, a communications service that allows a user to access the public telephone network from a stationary or moving vehicle, and which is based on a combination of radio transmission (i.e., wireless) and telephone switching (i.e., wireline). Individuals with small mobile telephones can utilize this system in the same manner that telephone calls are made using standard carriers. The cellular mobile service thus provides a communication link to the user by segmenting a large geographic area into smaller areas (i.e., cells). Cellular telephone system 30 can include cellular subscriber units which may be mobile or portable. Each base station 38 is connected to the public telephone company (i.e., TELCO) via one or more cellular switching networks (not shown). Each cellular subscriber has an assigned cellular telephone n umber that allows the user to place and receive calls within a widespread range of each base station 38, such as throughout a metropolitan area.

During a cellular telephone call, when a mobile cellular telephone moves from one cell to another, it must be handed-off to the next cell in order to continue communicating. This procedure is accomplished as follows for the analog cellular system. The cell serving the mobile cellular telephone and neighboring cell sites scans (i.e. takes samples of) the received mobile cellular telephone signal strength. This information is collected at a switch and a decision is made whether to hand-off the mobile cellular telephone call to a neighboring cell. "Handoff" occurs when the mobile or cellular telephone network automatically transfers a call from radio channel to radio channel as a mobile unit crosses adjacent cells. During a call, two parties are on one voice channel. When the mobile unit moves out of the coverage area of a given cell site, the reception becomes weak. At this point, the cell site in use requests a handoff. The system switches the cell to a stronger-frequency channel in a new site without interrupting the call or alerting the user. The call continues as long as the user is talking, and the user does not notice the handoff at all.

For the U.S. Digital Cellular System, as outlined in the Electronic Industries Association/Telecommunications Industry Association (EIA/TIA) Standard IS-54 document, the mobile cellular telephone also collects channel quality information (channel bit error rate (BER) and signal strength) on its own channel and signal strength measurements on neighboring cell channels. This information is transmitted to the serving cell site as a mobile assisted hand-off (MAHO) message to be added to the base scan information for making a hand-off decision. Such hand-off procedures can be utilized with the cellular telephone system described herein; however, such hand-off procedures are not necessary features of the present invention only and are merely included to describe one particular embodiment of the present invention.

A street or road 32, such as a metropolitan highway, is depicted as extending through cells 34 contained within cellular telephone system 30. Thus, a user can travel along road 32 through cells 34 and while travelling, perform cellular mobile telephone operations. Cellular telephone system 30 further includes a mobile telephone switching office (MTSO) 33, a central office for mobile switching in cellular telephone system 30. MTSO 33 houses a mobile switching center (MSC) 37, and fielded monitoring and relay stations (not shown) for switching calls from cell sites to wire line central offices such as (TELCO) 14 depicted in FIG. 1, or a public switched telephone network (PSTN), made up of local networks, exchange area networks, and long-haul networks that interconnect telephones and other communication devices on a worldwide basis. MSC 37 can control system operations in analog cellular networks. For example, MSC 37 can control calls, track billing information, and locate cellular subscribers. MSC 37 is a switch that provides services and coordination between mobile cellular telephone users in a network such as cellular telephone system 30 and external networks.

According to a preferred embodiment of the present invention, both voice and non-voice data may be simultaneously transmitted over a single channel to a mobile unit, such as cellular telephone 12 of FIG. 3. Given an existing voice call on, for example a time division multiple access (TDMA) system, a secondary channel for data can be established on the same radio frequency channel by manipulating assignment of calls on adjacent time slots or time intervals. A typical TDMA system operates according to the allocation of unique time slots or time intervals to the different users of a common channel. TDMA is used often in multiple or broadcast transmission, and is used extensively by satellite systems, local area networks (LANs), physical security systems, and combat net radio systems. The time slots or time intervals themselves start at a particular instance in a frame and is then allocated to a particular channel for transmitting data, such a character or an in-slot signal. The type of channel time interval or time slot utilized depends on the type of channel, such as a telephone channel time slot for multiplexing calls.

According to a preferred embodiment of the present invention, if a request to establish a data call arrives from a user with an active voice call, a resource manager examines adjacent time intervals or time slots contained on the same original radio frequency channel to determine occupancy. If occupied, the call in the adjacent time interval is "handed off" to another cell or another mobile unit. The type of "hand-off" is not important. Rather, the importance lies in the "hand-off" itself. When the hand-off procedure is complete, the adjacent time interval is now unoccupied and free. This free time interval is returned to the caller for use as a data channel. A data call composed of a transference of non-voice data is then established within this adjacent time interval and the mobile is instructed to widen its bandwidth to include both time intervals (i.e., the adjacent or secondary time interval, and the original or primary time interval). Thus, the non-voice and voice data are linked together as a single call processing entity. Any further call progression, such as additional hand-offs, operates on both sessions as a single unit.

Figure 4:
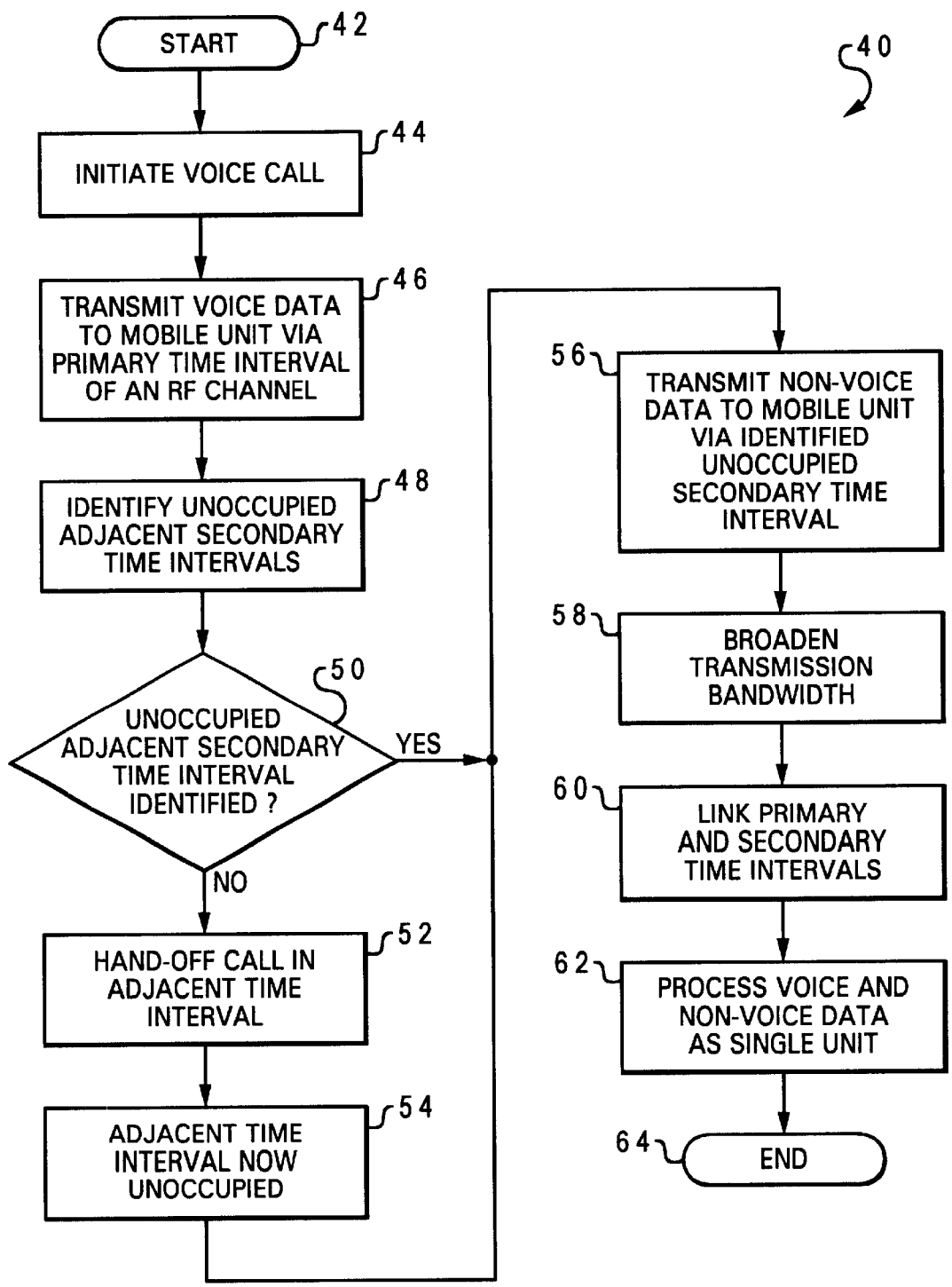
FIG. 4 illustrates a high-level flow chart of operations illustrative of a method in a communications network for the simultaneous transmission of both voice and non-voice data over a single radio frequency channel, in accordance with a preferred embodiment of the present invention.

FIG. 4 illustrates a high-level flow chart of operations 40 illustrative of a method in a communications network for the simultaneous transmission of both voice and non-voice data over a single radio frequency channel, in accordance with a preferred embodiment of the present invention. It can be appreciated by those skilled in the art that FIG. 4 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "linking," "transmitting," "identifying", which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind.

The present invention relates to method steps for processing electrical or other (e.g. mechanical, chemical) physical signals to generate other desired physical signals, and can be implemented via a computer such as microcomputer 130. However, it is not necessary to maintain within a computer memory of a cellular telephone, instructions implementing these method steps. Such instructions can be maintained with a computer memory at a cellular telephone base station or a central broadcasting center from which such base stations receive instructions. Implementation of the method described herein is left to the discretion of a particular cellular telephone system designer.

It can be appreciated by one skilled in the art that the methods or processes described herein can be implemented as a program product, such as a control program residing with a computer memory and containing instructions that when executed on a CPU, will carry out the operations depicted in the logic flow charts described herein. It is important to note that, while the present invention can be described in the context of a fully functional computer system, those skilled in the art can appreciate that the present invention is capable of being distributed as a program product in a variety of forms, and that the present invention applies equally, regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Preferred implementations of the invention can include implementations to execute the method or methods described herein as a program product residing in a memory of microcomputer 130, as depicted at FIG. 2. Alternatively, a preferred embodiment of the present invention can include a program product residing in a microcomputer memory located at an MSC (i.e., "MSC" is an acronym for "mobile switching center"). An MSC typically controls system operations in cellular networks. For example, an MSC can control calls, track billing information, and locate cellular subscribers. The program product thus includes sets of instructions for executing the method and systems described herein. Until required by the microcomputer, the set of instructions may be stored as a computer-program product in another computer memory, for example, in a disk drive attached to the microcomputer (which may include a removable memory such as an optical disk or floppy disk for eventual use in the disk drive).

Further, the computer-program product can also be stored at another computer and transmitted when desired to the user's workstation by a network or by an external network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Thus, as depicted at block 42, the process for the simultaneous transmission of wireless voice and non-voice data on a single radio frequency channel is initiated. As illustrated at block 44, a voice call is initiated in which voice data is transmitted to a mobile unit operating within a wireless communications system, such as cellular telephone system 10 of FIG. 1. As described next at block 46, voice data is transmitted to the mobile unit via a primary time interval of a single dedicated radio frequency channel through which the mobile unit is currently processing call data. As depicted at block 48, an attempt is made to identify unoccupied secondary time intervals that are located adjacent the primary time interval. Then, as illustrated at block 50, a test is performed to determine if any unoccupied adjacent secondary time intervals have been identified. If no adjacent unoccupied time intervals are identified, then as indicated at block 52 a hand-off procedure occurs in an adjacent time interval, in order to free the adjacent time interval for utilization as an unoccupied secondary time interval available to the mobile unit.

As illustrated thereafter at block 54, the adjacent time interval is now unoccupied and the process continues, as indicated at block 56. If an unoccupied adjacent secondary time interval is identified, as indicated at block 50, the process also continues, as depicted at block 56, wherein non-voice data is transmitted to the mobile unit via the identified unoccupied secondary time interval. As thereafter described at block 58, the transmission bandwidth of the mobile unit is automatically broadened to encompass both the primary time interval and the adjacent secondary time interval. As indicated at block 60, the primary time interval and the adjacent secondary time interval are linked within the single dedicated radio frequency channel, and then as illustrated at block 62, the voice data contained within the primary time interval and the non-voice data contained within the adjacent secondary time interval are processed simultaneously as a single unit within the single dedicated frequency channel.

The embodiments and examples set forth herein are presented in order to best explain the present invention and its practical application and to thereby enable those skilled in the art to make and utilize the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A program product residing in computer memory in a computer within a wireless communications network for the simultaneous transmission of voice and non-voice data over a single dedicated radio frequency channel to a mobile unit having a primary transmission bandwidth, said program product comprising:

instruction means residing in a computer for transmitting voice data to a mobile unit via a primary time interval within a single dedicated radio frequency channel;

instruction means residing in a computer for identifying an unoccupied adjacent secondary time interval available to said mobile unit;

instruction means residing in a computer for transmitting non-voice data to said mobile unit via said adjacent secondary time interval, in response to identifying said adjacent secondary time interval;

instruction means residing in a computer for automatically broadening said primary transmission bandwidth of said mobile unit to encompass both said primary time interval and said adjacent secondary time interval in response to said transmission of non-voice data to said mobile unit via said adjacent secondary time interval; and instruction means residing in a computer for linking said primary time interval and said adjacent secondary time interval within said single dedicated radio frequency channel to permit the subsequent processing of said voice and non-voice data as a single transmitted unit over said single dedicated radio frequency channel.

2. The program product of claim 1, wherein said instruction means residing in a computer for linking said primary time interval and said adjacent secondary time interval within said single dedicated radio frequency channel to permit the subsequent processing of said voice and non-voice data as a single transmitted unit over said single dedicated radio frequency channel, further comprises:

instruction means residing in a computer for linking said primary time interval and said adjacent secondary time interval within said single dedicated radio frequency channel via a call processing routine in order to permit the subsequent processing of said voice and non-voice data as a single transmitted unit over said single dedicated radio frequency channel.

3. The program product of claim 2 wherein said instruction means residing in a computer for identifying an unoccupied adjacent secondary time interval available to said mobile unit, further comprises:

instruction means residing in a computer for identifying a time interval adjacent said primary time interval, in order to determine occupancy of said adjacent time interval; and instruction means residing in a computer for performing a handoff of data contained within said adjacent time interval, if said adjacent time interval is occupied, in order to free said adjacent time interval for utilization as an unoccupied adjacent secondary time interval available to said mobile unit.

4. The program product of claim 3 wherein said wireless communications network comprises a cellular telephone communications network.

5. The program product of claim 4 further comprising:

instruction means residing in a computer for processing said voice and non-voice data as a single transmitted unit over said single dedicated radio frequency channel.

6. The program product of claim 5 wherein each of said instruction means within said computer system further comprises signal bearing media.

7. The program product of claim 6 wherein said signal bearing media further comprises transmission media.

8. The program product of claim 6 wherein said signal bearing media further comprises recordable media.

9. A system in a wireless communications network for the simultaneous transmission of voice and non-voice data over a single dedicated radio frequency channel to a mobile unit having a primary transmission bandwidth, said system comprising:

means for transmitting voice data to a mobile unit via a primary time interval within a single dedicated radio frequency channel;

means for identifying an unoccupied adjacent secondary time interval available to said mobile unit;

means for transmitting non-voice data to said mobile unit via said adjacent secondary time interval, in response to identifying said adjacent secondary time interval means for automatically broadening said primary transmission bandwidth of said mobile unit to encompass both said primary time interval and said adjacent secondary time interval in response to said transmission of non-voice data to said mobile unit via said adjacent secondary time interval; and means for linking said primary time interval and said adjacent secondary time interval within said single dedicated radio frequency channel to permit the subsequent processing of said voice and non-voice data as a single transmitted unit over said single dedicated radio frequency channel.

10. The system of claim 9 wherein said means for linking said primary time interval and said adjacent secondary time interval within said single dedicated radio frequency channel to permit the subsequent processing of said voice and non-voice data as a single transmitted unit over said single dedicated radio frequency channel, further comprises:

means for linking said primary time interval and said adjacent secondary time interval within said single dedicated radio frequency channel via a call processing routine in order to permit the subsequent processing of said voice and non-voice data as a single transmitted unit over said single dedicated radio frequency channel.

11. The system of claim 10 wherein said means for identifying an unoccupied adjacent secondary time interval available to said mobile unit, further comprises:

means for identifying a time interval adjacent said primary time interval, in order to determine occupancy of said adjacent time interval; and means for performing a handoff of data contained within said adjacent time interval, if said adjacent time interval is occupied, in order to free said adjacent time interval for utilization as an unoccupied adjacent secondary time interval available to said mobile unit.

12. The system of claim 11 wherein said wireless communications network comprises a cellular telephone communications network.

13. The system of claim 12 further comprising:
means for processing said voice and non-voice and non-voice data as a single transmitted unit over said single dedicated radio frequency channel.

14. A method in a wireless communications network for the simultaneous transmission of voice and non-voice data over a single dedicated radio frequency channel to a mobile unit having a primary transmission bandwidth, said method comprising the steps of:
transmitting voice data to a mobile unit via a primary time interval within a single dedicated radio frequency channel;
identifying an unoccupied adjacent secondary time interval available to said mobile unit;
transmitting non-voice data to said mobile unit via said adjacent secondary time interval, in response to identifying said adjacent secondary time interval;
automatically broadening said primary transmission bandwidth of said mobile unit to encompass both said primary time interval and said adjacent secondary time interval in response to said transmission of non-voice data to said mobile unit via said adjacent secondary time interval; and
linking said primary time interval and said adjacent secondary time interval within said single dedicated radio frequency channel to permit the subsequent processing of said voice and non-voice data as a single transmitted unit over said single dedicated radio frequency channel.

15. The method of claim 14 wherein the step of linking said primary time interval and said adjacent secondary time interval within said single dedicated radio frequency channel to permit the subsequent processing of said voice and non-voice data as a single transmitted unit over said single dedicated radio frequency-channel, further comprises the step of:
linking said primary time interval and said adjacent secondary time interval within said single dedicated radio frequency channel via a call processing routine in order to permit the subsequent processing of said voice and non-voice data as a single transmittal unit over said single dedicated radio frequency channel.

16. The method of claim 15 wherein the step of identifying an unoccupied adjacent secondary time interval available to said mobile unit, further comprises the steps of:
identifying a time interval adjacent said primary time interval, in order to determine occupancy of said adjacent time interval; and
performing a handoff of data contained within said adjacent time interval, if said adjacent time interval is occupied, in order to free said adjacent time interval for utilization as an unoccupied adjacent secondary time interval available to said mobile unit.

17. The method of claim 14 wherein the step of transmitting voice data to a mobile unit via a primary time interval within a single dedicated radio frequency channel, further comprises the step of:
transmitting voice data to a mobile unit within said wireless communications network via a primary time interval within a single dedicated radio frequency channel, wherein said wireless communications network comprises a cellular telephone communications network.

18. The method of claim 17 further comprising the step of:
processing said voice and non-voice data as a single transmitted unit over said single dedicated radio frequency channel.

* * * * *